(12) United States Patent
Garcia et al.

(10) Patent No.: US 10,780,849 B1
(45) Date of Patent: Sep. 22, 2020

(54) ELECTRIC DRIVE UNITS WITH INTEGRATED POWER ELECTRONICS FOR VEHICLE POWERTRAINS

(71) Applicant: GM GLOBAL TECHNOLOGY OPERATIONS LLC, Detroit, MI (US)

(72) Inventors: Pete R. Garcia, Troy, MI (US); John A. Diemer, Farmington Hills, MI (US); Konstantinos Triantos, Huntington Beach, CA (US); James Korsedal, Holly, MI (US); Patrick S. Portell, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/534,060

(22) Filed: Aug. 7, 2019

(51) Int. Cl.
| | |
|---|---|
| *B62D 65/10* | (2006.01) |
| *B60R 16/023* | (2006.01) |
| *B60K 6/405* | (2007.10) |
| *B60K 6/36* | (2007.10) |
| *B60L 50/60* | (2019.01) |

(52) U.S. Cl.
CPC ............ *B60R 16/0231* (2013.01); *B60K 6/36* (2013.01); *B60K 6/405* (2013.01); *B62D 65/10* (2013.01); *B60L 50/60* (2019.02); *B60L 2210/10* (2013.01); *B60L 2210/30* (2013.01); *B60Y 2200/91* (2013.01); *B60Y 2200/92* (2013.01); *B60Y 2306/05* (2013.01); *B60Y 2400/61* (2013.01)

(58) Field of Classification Search
CPC .................................. H02K 5/225; H02K 9/19
See application file for complete search history.

(56) References Cited

U.S. PATENT DOCUMENTS

| | | | |
|---|---|---|---|
| 2,990,508 A | 6/1961 | Thompson | |
| 4,297,627 A * | 10/1981 | Schaefer | H02K 17/30 310/71 |
| 5,166,568 A | 11/1992 | Nystuen et al. | |
| 5,331,239 A * | 7/1994 | Kwun | H02K 17/30 310/68 R |
| 6,163,127 A | 12/2000 | Patel et al. | |
| 6,674,205 B2 | 1/2004 | Biais et al. | |
| 7,969,058 B2 | 6/2011 | Rahman et al. | |
| 8,313,307 B2 * | 11/2012 | Nakagami | F04B 39/121 417/44.1 |

(Continued)

*Primary Examiner* — John D Walters
*Assistant Examiner* — James J Triggs
(74) *Attorney, Agent, or Firm* — Quinn IP Law

(57) ABSTRACT

Presented are electric drive unit (EDU) assemblies with integrated power electronics, methods for making/operating such EDU assemblies, and motor vehicles equipped with such EDU assemblies. An EDU assembly includes an outer housing that mounts to a vehicle body. The EDU outer housing has internal motor and transmission chambers and an external cavity. A traction motor is mounted inside the motor chamber and drives one or more vehicle wheels to thereby propel the vehicle. A gear train is mounted inside the transmission chamber and drivingly connects the traction motor to the vehicle wheels. An integrated power electronics (IPE) unit, which is operable to control the traction motor, includes an IPE outer housing with a housing chassis mounted inside the external cavity, and a main housing mounted on the housing chassis to define therebetween a power electronics (PE) chamber. Multiple integrated circuit (IC) PE modules are mounted inside the PE chamber.

20 Claims, 5 Drawing Sheets

(56) References Cited

U.S. PATENT DOCUMENTS

| | | | |
|---|---|---|---|
| 8,596,397 B2 * | 12/2013 | Sakamoto | H05K 5/0204 |
| | | | 180/68.5 |
| 8,684,257 B2 | 4/2014 | Osborne et al. | |
| 8,928,197 B2 | 1/2015 | Jurkovic et al. | |
| 8,929,097 B2 * | 1/2015 | Nakasaka | H01L 23/473 |
| | | | 361/688 |
| 8,933,606 B2 | 1/2015 | Rahman et al. | |
| 9,452,682 B2 | 9/2016 | Triantos et al. | |
| 9,637,127 B1 | 5/2017 | Cooper | |
| 9,866,092 B2 | 1/2018 | Hanna et al. | |
| 10,253,763 B2 * | 4/2019 | Nakagami | F01C 21/10 |
| 2003/0094920 A1 * | 5/2003 | Numaguchi | H02K 11/02 |
| | | | 318/801 |
| 2003/0200761 A1 * | 10/2003 | Funahashi | F04B 35/04 |
| | | | 62/228.4 |
| 2006/0017345 A1 | 1/2006 | Uchida et al. | |
| 2007/0216249 A1 | 9/2007 | Gruendel et al. | |
| 2008/0205107 A1 * | 8/2008 | Hattori | H05K 7/1432 |
| | | | 363/123 |
| 2009/0045688 A1 | 2/2009 | Liang et al. | |
| 2010/0244610 A1 | 9/2010 | Hao et al. | |
| 2011/0062902 A1 | 3/2011 | Patel et al. | |
| 2011/0109180 A1 | 5/2011 | Akutsu et al. | |
| 2011/0169363 A1 | 7/2011 | Summers et al. | |
| 2011/0198962 A1 | 8/2011 | Tang | |
| 2013/0049495 A1 * | 2/2013 | Matsuo | G06F 16/178 |
| | | | 310/53 |
| 2013/0049516 A1 | 2/2013 | Kleber et al. | |
| 2013/0049518 A1 | 2/2013 | Kleber et al. | |
| 2013/0127291 A1 | 5/2013 | Agapiou et al. | |
| 2013/0147303 A1 | 6/2013 | Kaiser et al. | |
| 2013/0270952 A1 | 10/2013 | Jurkovic et al. | |
| 2014/0202279 A1 | 7/2014 | Triantos et al. | |
| 2014/0252903 A1 | 9/2014 | Rahman et al. | |
| 2015/0333602 A1 * | 11/2015 | Mohr | H02K 9/19 |
| | | | 310/54 |
| 2015/0372559 A1 * | 12/2015 | Hattori | H02K 5/225 |
| | | | 310/71 |
| 2016/0248302 A1 * | 8/2016 | Nagao | H02K 11/33 |
| 2017/0224050 A1 * | 8/2017 | Schouwenburg | A43B 7/141 |
| 2017/0294821 A1 * | 10/2017 | Shimizu | H02K 9/19 |
| 2020/0083778 A1 * | 3/2020 | Pack | H02K 5/24 |

* cited by examiner

ELECTRIC DRIVE UNITS WITH INTEGRATED POWER ELECTRONICS FOR VEHICLE POWERTRAINS

The present disclosure relates generally to motor vehicle powertrains. More specifically, aspects of this disclosure relate to electric-drive vehicles and powertrains with a traction motor, transmission, and power inverter combined into an electric drive unit.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and efficiency. Such engines include compression-ignited (CI) diesel engines, spark-ignited (SI) gasoline engines, two, four, and six-stroke architectures, and rotary engines, as non-limiting examples. Hybrid electric and full electric ("electric-drive") vehicles, on the other hand, utilize alternative power sources to propel the vehicle, such as an electric motor generator unit (MGU), and therefore minimize or eliminate reliance on a fossil-fuel based engine for tractive power.

A full electric vehicle (FEV)—colloquially identified as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery pack, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. Since hybrid vehicles are able to derive their power from sources other than the engine, hybrid electric vehicle (HEV) engines may be turned off, in whole or in part, while the vehicle is propelled by the electric motor(s).

High-voltage (HV) electrical systems govern the transfer of electricity between each traction motor and a rechargeable traction battery pack (also referred to as "electric-vehicle battery" or "EVB") that stores and supplies the requisite power for operating hybrid and full-electric powertrains. HV electric systems may employ a front-end DC-to-DC electric power converter that is electrically connected to the vehicle's traction battery pack(s) in order to increase the supply of voltage to a high-voltage main direct current (DC) bus and an electronic power inverter. A high-frequency bulk capacitor may be arranged across the positive and negative terminals of the main DC bus to provide electrical stability and store supplemental electric energy. Bulk capacitor size—in terms of total capacitance—may be selected based upon expected DC bus voltage range, peak current and ripple voltage when operating the inverter employing, for example, a six-step mode of operation. Operation and control of multi-phase electric motor/generator units, such as permanent magnet synchronous traction motors, may be accomplished by employing the inverter to transform DC electric power to alternating current (AC) power using pulse-width modulated control signals output from a resident vehicle controller.

Various multi-speed power transmission architectures have been developed for selectively transmitting rotational power from the vehicle's prime mover to the final drive system. An available type of power transmission is the electrically-variable electric drive unit (EDU) that contains one or more electric motor/generator units, epicyclic gear train elements, clutches, power electronics and, optionally, differential and axle components. The clutches govern engagement/disengagement of the gear train elements to provide for electrically-variable modes, fixed speed ratio modes, and electric-only ("battery power") modes of operation. The electronic power inverter assembly is utilized to control operation of the EDU's motor/generator unit(s). Generally, the power inverter, DC-to-DC power converter, and other requisite power electronic modules are assembled remote from and subsequently mounted to the EDU. Assembly of the individual power electronic modules to the EDU is labor intensive and necessitates additional mounting hardware, electrical connectors, sealing gaskets, and dedicated housing containers to secure each module to the EDU. Furthermore, the EDU's power electronic modules are cooled by pipes and related plumbing to route coolant fluid into each module's discrete housing; additional packaging space is needed to accommodate the additional pipes and plumbing.

SUMMARY

Presented herein are electric drive unit assemblies with integrated power electronics (IPE), vehicle powertrains equipped with such EDU assemblies, methods for making and methods for operating such EDU assemblies, and electric-drive vehicles equipped with modular EDU assemblies with integrated power electronics and transaxles. By way of example, a modular EDU assembly includes an electric traction motor, a gearbox, an electric circuit, and a housing. The electric traction motor may be in the nature of a single or a pair of motor/generator units. For some applications, the gear box may comprise a planetary gear train, clutches, differential, and axle shafts. The electric circuit may be composed of an AC-DC power inverter module (PIM), a DC-DC converter and auxiliary power module (APM), an onboard charge module (OBCM), a high-power distribution module (HPDM), and other power electronic componentry. All power electronic modules are sealed within a singular, internally cooled IPE outer housing; the shared IPE housing seats within an IPE cavity in and fastens to the EDU outer housing.

A front-drive EDU assembly takes on a tall, narrow footprint with an AC rod connection to a composite oil reservoir cover that is located on top of the drive unit housing. The AC rod connector internally interfaces with a three-phase terminal assembly of the motor's stator; the oil cavity and bolted interface are cooled with oil. The AC rod connector externally interfaces with the 3-phase bus bar assembly; doing so moves the connection points to a location near the perimeter of a power electronic mounting flange. External to the drive unit housing, but internal to the power electronic flange, is a dry cavity that is sealed within the integrated power electronics shared housing assembly. The IPE assembly includes a power inverter module and other componentry related to usage of the front-drive EDU in battery electric vehicle (BEV) platforms. Additionally, the IPE assembly utilizes a DC connector that interfaces with a rechargeable electric storage system (RESS).

In contrast to front-drive EDU assemblies, a rear-drive EDU assembly takes on a low, wide footprint. Rear-drive EDU assemblies may incorporate a fixed AC rod connection to the housing. The AC rod connector internally interfaces with the 3-phase terminal assembly of the stator; an oil cavity and the bolted interface are cooled with oil. The AC rod connector externally interfaces with the 3-phase bus bar assembly of the power inverter module. The power inverter module has a sealing interface to the housing, situated in a dry cavity. Furthermore, the power inverter module has a DC connector that interfaces with the on-board RESS.

Strategic integration of the power electronics to the electric drive unit helps to achieve increased packaging efficiencies and weight savings. Vehicle packaging may be further optimized through calculated positioning of the electric drive unit and transaxle, as well as the consolidated arrangement of desired power electronic content. Sealing the power electronics in a single, unitary IPE housing, which is mounted directly to the EDU housing, enables maximum packaging compactness and a wide-bolt layout that ameliorates noise, vibration and harshness (NVH). Attendant benefits for at least some of the disclosed integrated power electronics designs include improved efficiencies in power transfer and the ability to cool the stator terminals with oil. Other attendant benefits may include reduced system complexity and minimized design and part costs by eliminating the peripheral electronic hardware and fluid plumbing for designs utilizing discrete housings for each power electronics module.

Aspects of this disclosure are directed to electric drive units with integrated power electronics. An EDU assembly is presented for driving a motor vehicle with multiple road wheels attached to the vehicle's body. The EDU assembly includes a rigid outer housing that mounts to the vehicle body. Defined inside the EDU outer housing are an internal motor chamber and an internal transmission chamber; an external cavity is defined on an exterior surface of the EDU outer housing. A single or multiple traction motors are mounted inside the EDU housing's internal motor chamber and operable to drive one or more of the road wheels to thereby propel the vehicle. A gear train, which is mounted inside the EDU housing's internal transmission chamber, drivingly connects the traction motor(s) to the vehicle's road wheels. Governing operation of the traction motor(s) is an IPE unit that is fabricated with a rigid IPE outer housing. The IPE outer housing includes a housing chassis mounted inside the EDU outer housing's external cavity, and a main housing mounted on the housing chassis to define therebetween a PE chamber. Multiple integrated circuit (IC) PE modules are mounted inside the PE chamber.

Additional aspects of this disclosure are directed to electric-drive vehicles and vehicle powertrains equipped with EDU assemblies having integrated power electronic modules. As used herein, the terms "vehicle" and "motor vehicle" may be used interchangeably and synonymously to include any relevant vehicle platform, such as passenger vehicles (REV, FEV, BEV, PHEV, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels and other standard original equipment. For hybrid configurations, an internal combustion engine is mounted inside an engine bay of the vehicle body and operates alone or in conjunction with a single or multiple traction motors to drive one or more of the road wheels to thereby propel the vehicle.

Continuing with the discussion of the above example, the motor vehicle also includes a modular EDU assembly with a rigid outer housing that is mounted to the vehicle body. The traction motor(s) is/are mounted inside an internal motor chamber of the EDU housing. A gear train, such as an electrically-variable transmission with a differential and mating axle half shafts, is mounted inside an internal transmission chamber of the EDU housing. This gear train drivingly connects the traction motor(s) to the vehicle's road wheels. A power electronics unit operable to govern operation of the traction motor is integrated into the EDU assembly. The IPE unit includes a rigid IPE outer housing with a housing chassis mounted inside the external cavity of the EDU outer housing, and a main housing mounted on the housing chassis to define therebetween a PE chamber. Three to five (or more) IC PE modules are mounted inside the PE chamber. These PE modules may include a DC-DC power converter module, an AC-DC power inverter module, an onboard charge module and, optionally, a high-power distribution module.

Additional aspects of this disclosure are directed to methods for making and methods for operating any of the disclosed electric drive unit assemblies, vehicle powertrains, and motor vehicles. In an example, a method is presented for assembling an EDU assembly for a motor vehicle. This representative method includes, in any order and in any combination with any of the above and below options and features: providing an EDU outer housing configured to mount to the vehicle body, the EDU outer housing defining therein an internal motor chamber and an internal transmission chamber and defining on an exterior surface thereof an external cavity; mounting a traction motor inside the internal motor chamber of the EDU housing, the traction motor being configured to drive one or more of the road wheels to thereby propel the motor vehicle; mounting a gear train inside the internal transmission chamber of the EDU housing, the gear train being configured to drivingly connect the traction motor to the one or more road wheels; providing an IPE unit operable to govern operation of the traction motor, the IPE unit including an IPE outer housing composed of a housing chassis and a main housing mounted on the housing chassis to define therebetween a power electronics (PE) chamber, and a plurality of integrated circuit PE modules mounted inside the PE chamber; and mounting the housing chassis inside the external cavity of the EDU outer housing.

For any of the disclosed EDUs, powertrains, vehicles and methods, the IPE outer housing may be a tripartite construction with a main case, a housing cover mounted on the main case, and the main case mounted on the housing chassis. The housing cover may include a high-voltage direct current (HVDC) electrical connector, and the main case may include a high-voltage alternating current electrical connector. Optionally, the main case may also include HVDC electrical connectors for an air conditioning control module (ACCM), a cabin heater control module (CHCM), and a storage heater control module (SHCM). The main case may include an integrated cooling manifold, a cooling inlet port that feeds coolant into the IPE outer housing, and a cooling exit port that exhausts coolant from the IPE outer housing. Optionally, three IC PE modules may be mounted between the main case and housing cover, and a fourth IC PE module may be mounted between the main case and the housing chassis. The IPE outer housing may have an IPE interface flange that projects from the main housing, and the EDU outer housing may have an EDU interface flange that projects from the external cavity; the IPE interface flange seals to the EDU interface flange along a single plane.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
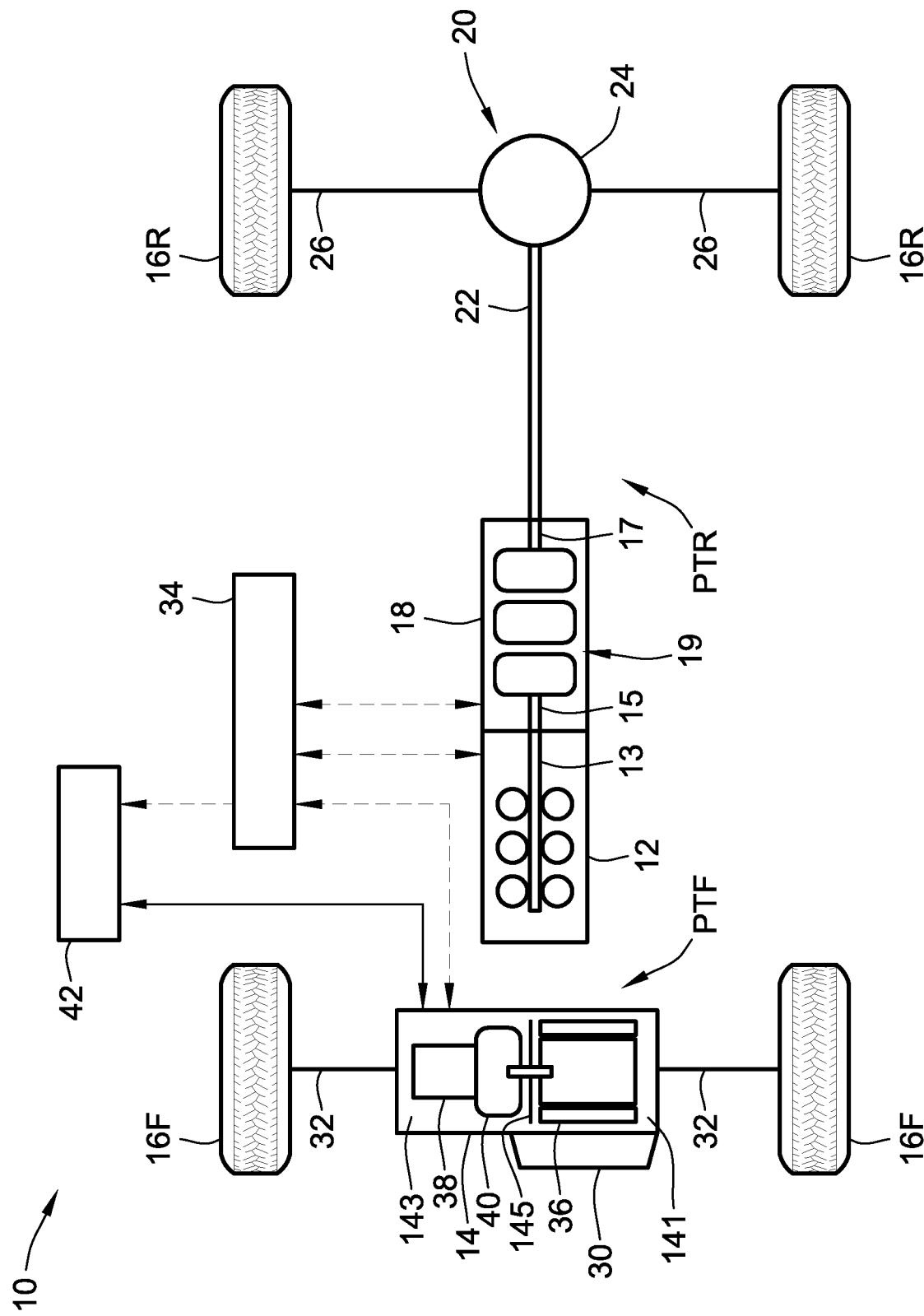
FIG. 1 is a schematic illustration of a representative electric-drive motor vehicle with a hybrid powertrain having an engine assembly and an electric drive unit operable to propel the vehicle in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a four-wheel drive (4WD) passenger vehicle with a hybrid-electric powertrain. In particular, the illustrated powertrain is generally composed of an internal combustion engine (ICE) assembly 12 and an electric drive unit (EDU) assembly 14 that operate, individually and in concert, to transmit tractive power to drive one or more road wheels 16R, 16F of the vehicle's final drive system. The illustrated automobile 10—also referred to herein as "motor vehicle" or "vehicle" for short—is merely an exemplary application with which novel aspects and features of this disclosure can be practiced. In the same vein, implementation of the present concepts into a 4WD hybrid powertrain architecture should also be appreciated as an exemplary application of the novel concepts disclosed herein. As such, it will be understood that aspects and features of the present disclosure can be applied to other powertrain configurations and utilized for any logically relevant type of motor vehicle. Lastly, only select components have been shown and will be described in additional detail herein. Nevertheless, the vehicles, powertrains, and drive units discussed below can include numerous additional and alternative features, and other available peripheral components, e.g., for carrying out the various methods and functions of this disclosure.

The 4WD powertrain of automobile 10 is shown split into two discrete branches: a rear (first) powertrain PTR and a front (second) powertrain PTF. Rear powertrain PTR is represented herein by a restartable internal combustion engine 12 that is drivingly connected to a backend final drive system 20 by a multi-speed automatic power transmission 18. The engine 12 transfers power, preferably by way of torque via an engine crankshaft 13 ("engine output member"), to an input side of the transmission 18. The transmission 18, in turn, is adapted to receive, selectively manipulate, and distribute tractive power from the engine 12 to the vehicle's final drive system 20 and thereby propel the vehicle 10. The rear final drive system 20 of FIG. 1 is generally composed of a drive shaft 22 that drivingly connects the power transmission 18 to a rear limited-slip differential 24; a pair of rear axle shafts 26 drivingly connect the differential 24 to a set of rear road wheels 16R.

The ICE assembly 12 operates to propel the vehicle 10 independently of the EDU assembly 14, e.g., in an "engine-only" operating mode, or in cooperation with the EDU assembly 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the vehicle's driveline system may take on any available configuration, including front wheel drive (FWD) layouts, rear wheel drive (RWD) layouts, all-wheel drive (AWD) layouts, six-by-four (6×4) layouts, etc.

Power transmission 18 may use differential gearing 19 to achieve selectively variable torque and speed ratios between the transmission's input shaft 15 ("transmission input member") and output shaft 17 ("transmission output member"), e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 18 may optionally take on other suitable configurations, including Continuously Variable Transmission (CVT) architectures, automated-manual transmissions, etc.

Front powertrain PTF of FIG. 1 is represented herein by an electric drive unit assembly 14 with an integrated power electronics (IPE) unit 30 that drives a set of front road wheels 16F through a respective pair of front axle shafts 32. EDU assembly 14 may be generally typified by a solitary electric traction motor 36 having a single-speed reduction gearbox 38, e.g., with two gear reductions, and a transverse-split, bevel-type differential 40. Modulation of the EDU assembly 14 is controlled by an in-vehicle electronic control unit (ECU) 34 for delivering motive power to the ground-engaging road wheels 16F. Compact arrangement of the contents of the EDU assembly 14 permits the use of a drive unit in substitution for a conventional motor assembly with torque-delivering differential and axle system. In accord with the powertrain architecture of FIG. 1, the front powertrain PTF delivers motive power to front road wheels 16F while the rear powertrain PTR delivers motive power to rear wheels 16R. However, alternative powertrain arrangements may employ the EDU assembly 14 to drive the rear wheels 16R, employ the EDU assembly 14 to drive the front and/or rear wheels 16F, 16R while altogether eliminating the ICE assembly 12, or employ the ICE assembly 12 and EDU assembly 14 to cooperatively drive the front wheels 16F, rear wheels 16R, or both.

With continuing reference to FIG. 1, the electric traction motor 36 may take on any motor configuration of suitable size and power to propel vehicle 10, including a permanent magnet synchronous motor/generator unit. Electric power is provided to the traction motor 36 through electrical conductors or cables that pass through a protective casing in suitable sealing and insulating feedthroughs (not illustrated). Conversely, electric power may be provided from the traction motor 36 to an onboard traction battery pack 42, e.g., through regenerative braking. While shown as a hybrid-electric architecture with one traction motor for independently driving two vehicle wheels 16F, the vehicle 10 may employ other powertrain configurations with multiple traction motors, any of which may be adapted for a full-electric vehicle (FEV), battery electric vehicle (BEV), plug-in hybrid electric vehicle (PHEV), fuel-cell hybrid electric vehicle (FCEV), etc.

As indicated above, ECU 34 is constructed and programmed to govern, among other things, operation of the engine 12, drive unit 14, transmission 18, and traction battery pack 42. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 34 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use. Alternatively, routines may be executed in response to occurrence of an event during operation of the vehicle 10.

Figure 3:
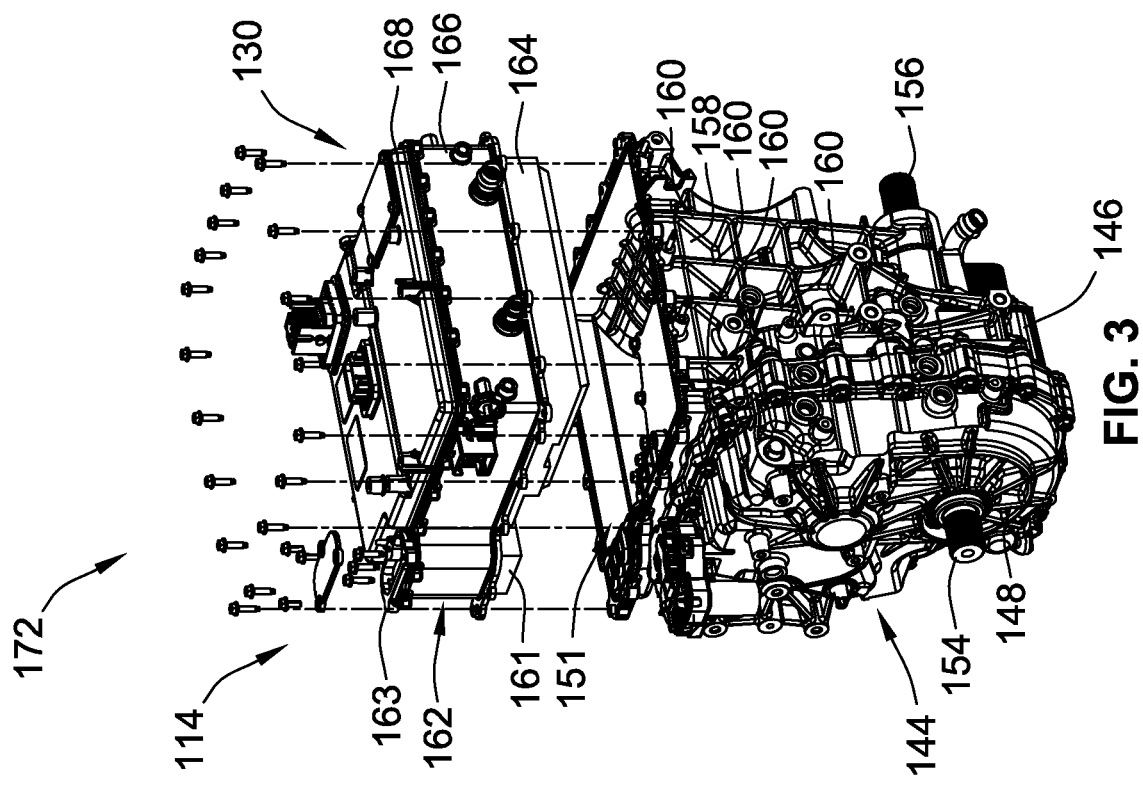
FIG. 3 is a partially exploded, perspective-view illustration of the representative electric drive unit with IPE unit of FIG. 2.
Figure 2:
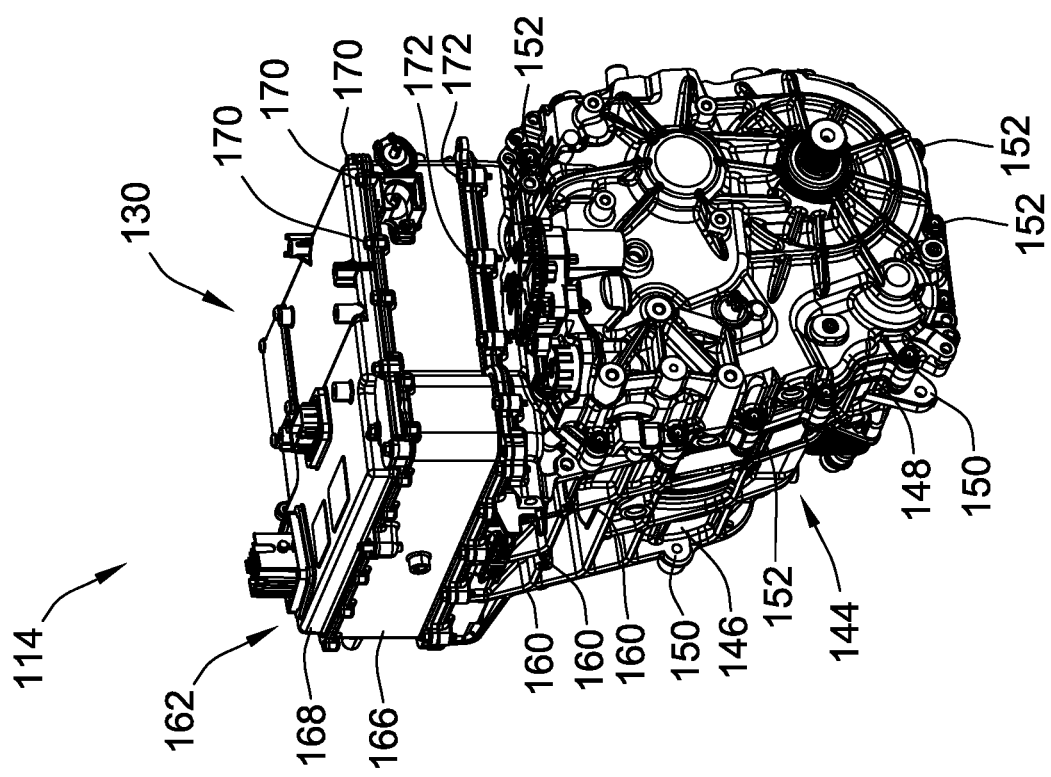
FIG. 2 is a perspective-view illustration of a representative electric drive unit (EDU) with an integrated power electronics (IPE) unit in accordance with aspects of the present disclosure.

Referring now to FIGS. 2 and 3, there is shown a representative EDU assembly 114 for propelling an electric-drive motor vehicle, such as hybrid electric vehicle 10 of FIG. 1. The EDU assembly 114 includes a multi-section, protective outer housing 144 ("EDU outer housing") onto which is mounted an IPE unit 130. Integral fastener tabs 150 receive mounting lugs (not shown) that allow the EDU's outer housing 144 to be suspended within an engine bay of the vehicle body, e.g., adjacent ICE assembly 12 of FIG. 1. The EDU outer housing 144 of FIGS. 2 and 3 may be cast or machined from a rigid metallic or polymeric material with a cover plate 148 that secures, e.g., via bolts 152, to a main casing 146. Securely fastening the cover plate 148 to the main casing 146 creates an internal motor chamber 141 that is separated by a radial support wall 145 from an internal transmission chamber 143, which are best seen in FIG. 1. A traction motor, such as electric traction motor 36 of FIG. 1, is mounted inside the EDU housing's motor chamber 141, whereas a gear train, such as gearbox 38 and differential 40, is mounted inside the transmission chamber 141. It should be appreciated that the specific shape and size of the illustrated outer housing 144 may be specific to the intended application of the EDU assembly 114 and is, thus, non-limiting in nature.

For at least some embodiments, the motor chamber 141 may be fluidly sealed as a wet chamber, i.e., for receiving transmission oil, and the transmission chamber 141 may be fluidly sealed as a dry chamber, i.e., storing air. Nevertheless, the traction motor(s) stowed inside the motor chamber 141 is/are drivingly connected, e.g., by an appropriate motor output shaft, to the gear elements of the gear train stowed inside the transmission chamber 141. Electric drive unit assembly 114 may be configured as a single-speed or a multi-speed power transmission device (e.g., a two-speed drive module may be coupled to the housing 144 as a bolt-on modification to provide multi-speed functionality). A pair of drive unit output shafts, namely port and starboard-side output shafts 154 and 156, respectively, are adapted to spline to corresponding axle shafts, such as front axle shafts 32 of FIG. 1, for driving engagement with at least two of the vehicle's road wheels.

In accord with the illustrated example, the EDU's outer housing 144 includes a bowl-shaped external cavity 151 that securely seats therein the IPE unit 130. This IPE unit 130 exchanges data with, and receives command signals from, the ECU 34 to govern operation of the traction motor or motors contained within the EDU housing 144. An upper "crown" section of the main casing 146 is formed with a basin 158 that is delineated by four interconnected sidewalls adjoining a base to define the external cavity 151. A series of structural reinforcing ribs 160 is spaced around the outer perimeter of this basin 158, helping to buttress the IPE unit 130 while concomitantly reducing gross weight of the combined assembly. The basin 158 and ribs 160 of FIG. 2 are integrally formed with the main casing 146 as a unitary, single-piece structure. The interior of the basin 158 may be shaped complementary to an IPE outer housing 162 to ensure a flush fit of the IPE unit 130 within the external cavity 151.

Integrated power electronics unit 130 includes a multi-section, protective outer housing 162 ("IPE outer housing") that mounts on top of the EDU's outer housing 144. The IPE outer housing 162 may be cast or machined from a rigid metallic or polymeric material with a bottom-most housing chassis 164 that provides subjacent support for a main housing, which is represented in FIG. 2 by an intermediate main case 166 and a top-most housing cover 168. As shown, the housing chassis 164 nests inside the basin 158 and sits generally flush against the outboard facing surfaces of the external cavity 151 of the EDU outer housing 144. The housing cover 168 is mechanically attached, e.g., via self-aligning screws 170, on an upper end of the main case 166. Sandwiched between the housing cover 168 and chassis 164, the main case 166 is rigidly secured, e.g., via bolts 172, on the housing chassis 164. The main case 166 is fabricated with two mounting interfaces: an integral bottom flange 161 with two sets of bolt holes, one for securing to the housing chassis 164 and one for securing to the EDU outer housing 144; and an integral top flange 163 with a set of fastener holes for mounting the housing cover 168. Both flanges 161 and 163 extend in a continuous fashion around the perimeter of the main case 166. While shown as a tripartite construction, the IPE's outer housing 162 may comprise greater or fewer than three sections. Since the IPE unit 130 is mounted into the EDU basin 158, for example, the housing chassis 164 may be eliminated. In some applications, including rear-wheel drive powertrain architectures, the housing chassis 164 is added to close out the assembly.

Figure 4:
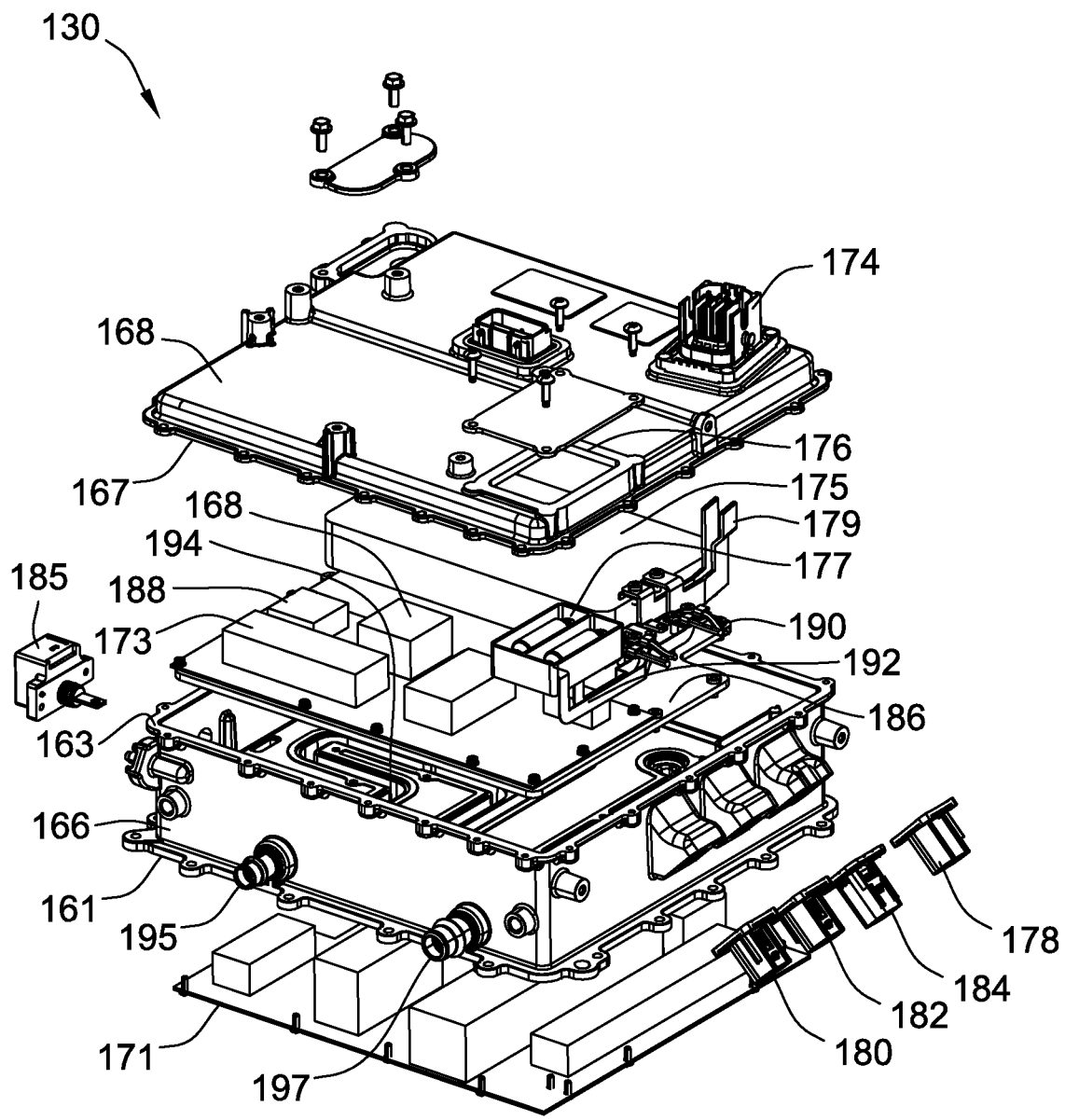
FIG. 4 is an exploded, perspective-view illustration of the representative IPE unit of FIGS. 2 and 3.

FIG. 4 presents an exploded illustration of the representative IPE unit 130 of FIGS. 2 and 3 with the housing chassis 164 removed for simplicity and ease of reference. Housing cover 168 is fabricated as a single-piece, rigid structure with an integral flange 167 that extends continuously around the outer perimeter of the cover 168 and includes fastener holes for fastening to the top flange 163 of the main case 166 via screws 170. Assembled into the housing cover 168 is a high-voltage direct current (HVDC) electrical connector 174 for electrically connecting the IPE module 130 to a vehicle battery, such as onboard traction battery pack 42 of FIG. 1, via a corresponding cable harness. Spaced from the HVDC electrical connector 174 is a connector junction 176 that provides an access port for electrically connecting the IPE module 130, via a corresponding cable harness, to a powertrain control module (PCM), which may be embodied as a discrete controller or incorporated into ECU 34 of FIG. 1. The EDU and IPE outer housings 144 and 162 may be fabricated from distinct materials or the same material, including A360 stainless steel and/or ADC2 or ADC3 aluminum alloys.

With continuing reference to FIG. 4, the IPE housing's main case 166 is fabricated as a single-piece, rigid structure that functions as the primary platform for supporting and electrically interconnecting the IPE unit's numerous power electronic (PE) modules. In the illustrated example, multiple electrical junctions are assembled into the main case 166, including: a high-voltage alternating current (HVAC) electrical connector 178; an air conditioning control module (ACCM) HVDC electrical connector 180; a cabin heater control module (CHCM) HVDC electrical connector 182; and a storage heater control module (SHCM) HVDC electrical connector 184. It is envisioned that the main case 166 may be equipped with greater or fewer electrical connectors than those enumerated above. For instance, a dedicated cable harness (not shown) may be coupled to a coolant pump HVAC electrical connector 185 to deliver alternating current energy to a fluid pump (not visible in the views provided). A cooling cover 186, which is seated on a top surface of the main case 166, provides subjacent support for a busbar assembly module 188, a DSC cooling jacket 190, and a high-voltage distribution panel 192. While shown with a generally square-polyhedral shape, the main case 166 may take on alternative shapes and sizes without departing from the intended scope of this disclosure.

In addition to the features mentioned above, the integrated power electronics unit 130 is furnished with an internal cooling system for regulating the operating temperatures of the various PE modules contained within the IPE outer housing 162. The main case 166 is fabricated with an integral cooling manifold 194 that is fluidly connected to a cooling inlet port 195 and a cooling exit port 197. Coolant is fed from a suitable coolant sump into the IPE outer housing 162 through the cooling inlet port 195, and coolant is exhausted from the IPE outer housing 162 through the cooling exit port 197. Coolant fluid, which may be in the nature of ethylene glycol or deionized water or a mixture of the two, is delivered to and circulated through the IPE unit 130 inside the main case 166 to cool the various IPE components. By utilizing a single internal cooling system to cool the PE modules, the IPE unit 130 design helps to eliminate superfluous coolant hoses, conduits, seals, etc., that would otherwise be necessitated by systems that employ a discrete housing for each PE module.

Multiple integrated circuit (IC) based PE modules are mounted inside an internal PE chamber within the IPE's outer housing 162. In accord with the representative architecture illustrated in FIG. 4, an onboard charge module (OBCM) 171 is mounted to an underside of the main case 166, between the housing chassis 164 and cover 168. This OBCM 171 is adapted to connect to an electric vehicle charging station (EVCS) or other appropriate electric vehicle supply equipment (EVSE) for recharging the vehicle's onboard traction battery pack, e.g., using a wall-mounted charge cable or a household outlet. An auxiliary power module (APM) with an HV-12V DC/DC power converter module 173 is mounted to a topside of the main case 166 underneath the housing cover 168. The APM 173 is operable as a DC-to-DC converter that modulates power from the RESS or battery pack to a standard vehicle voltage, such as a nominal voltage for 12V starting, lighting, and ignition (SLI) battery and 12V vehicle accessory loads.

Also mounted onto the main case 166 underneath the housing cover 168 are an IPE control board 175 with a low-voltage input/output (LVIO) peripheral card connector 177 and a gate board 179. The IPE control board 175 may carry an AC-DC power inverter module (PIM), a DC-DC step-up module and, optionally, a high-power distribution module (HPDM). The PIM is an element of the PE control subsystem that regulates transmission of electrical energy to and from the traction motor(s). The step-up module may be used to ensure the motor control voltage for the traction motor meets the input DC bus voltage. The HPDM may be embodied as an electrical junction box that distributes high-voltage power from the RESS to a predesignated assortment of high-voltage components. Recognizably, the PE modules may be comprised of fewer or greater or different modules than that which are shown in FIG. 4.

Figure 5:
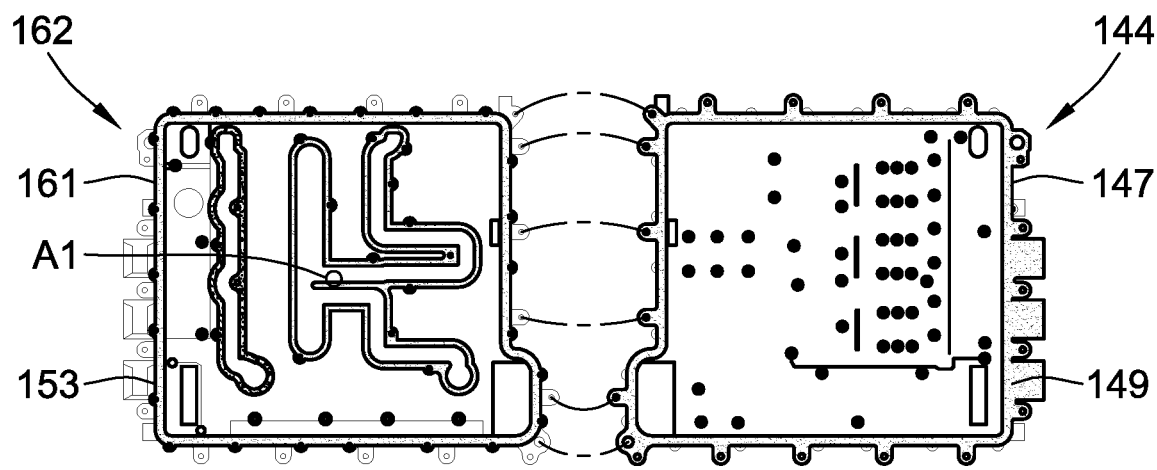
FIG. 5 is a plan-view illustration of a single-plane mounting and sealing interface of the EDU assembly and IPE unit of FIGS. 2 and 3.
Figure 6:
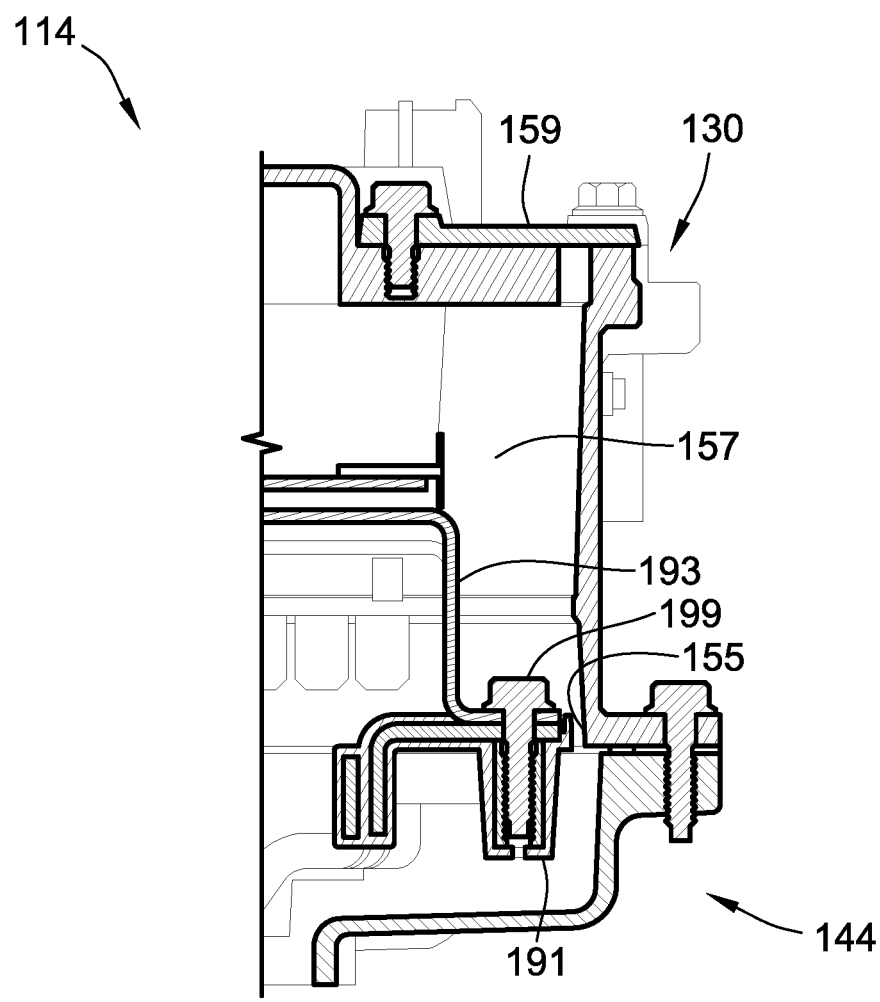
FIG. 6 is a sectional, side-view illustration of an AC busbar interface section of the representative EDU assembly and IPE unit of FIGS. 2 and 3.

To help simplify and expedite the assembly process for the EDU assembly 114, the entire IPE unit 130, including all of the requisite PE modules packaged within the IPE outer housing 162, is operatively mounted in unison onto the EDU's outer housing 144. As shown in FIG. 5, the IPE outer housing 162 is mechanically attached along on a single plane—bolted down over a series of coplanar interfaces—to the EDU outer housing 144. The main case 166 of the IPE's outer housing 162 is fabricated with a planar IPE interface flange 161 that projects generally orthogonally from a lower end of the main case 166. An uppermost end of the EDU's outer housing 144 is fabricated with a planar EDU interface flange 147 that projects generally orthogonally from the exterior surface of the housing 144, extending continuously around an upper extent of the external cavity 151. The IPE's interface flange 161 bolts on and seals to the EDU's interface flange 147 along a single plane (e.g., a plane orthogonal to a vertical axis A1 extending through the center of the EDU's main casing 146).

Figure 8:
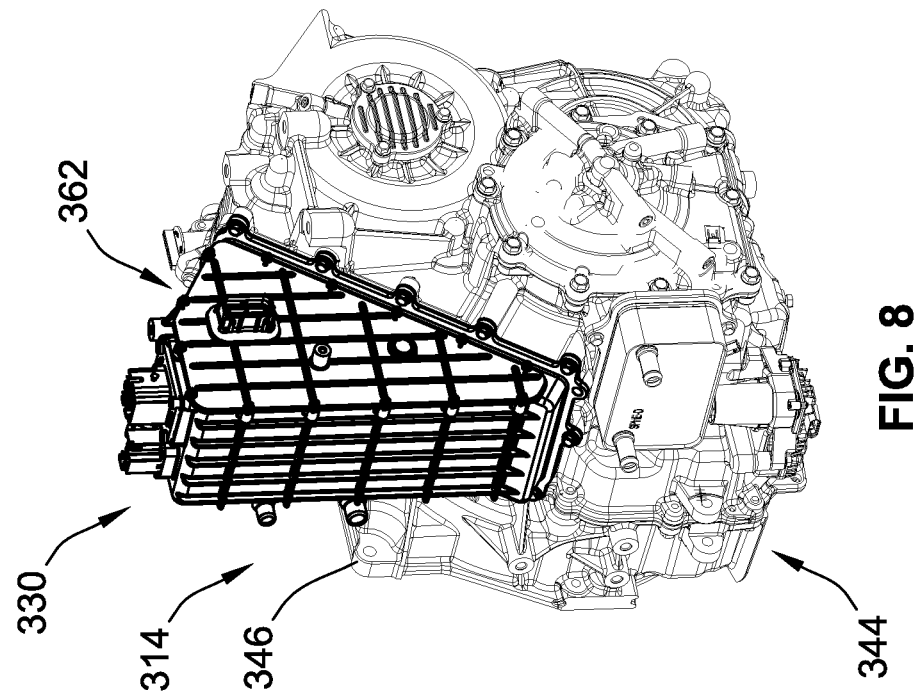
FIG. 8 is a perspective-view illustration of yet another representative EDU assembly with IPE unit in accordance with aspects of the present disclosure.
Figure 7:
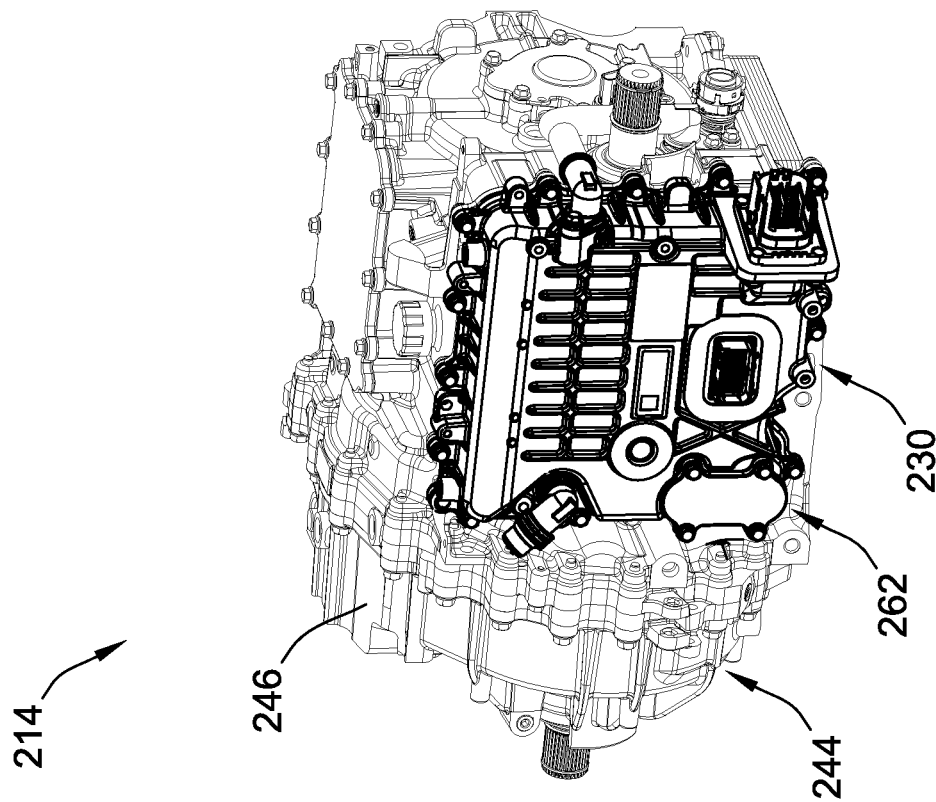
FIG. 7 is a perspective-view illustration of another representative EDU assembly with IPE unit in accordance with aspects of the present disclosure.

While shown extending in a continuous manner around the outer perimeters of the basin 158 and main case 166, the EDU and IPE interface flanges 147 and 161 may consist of discontinuous flanges or discrete tabs. A first gusset 149 extends continuously around the perimeter of the external cavity 151, and sandwiches between the interface flanges 147, 161. A second gusset 153 extends continuously around the perimeter of the main case 166 and housing chassis 164, and sandwiches between the IPE's interface flange 161 and complementary interface (not visible in the views provided) of the housing chassis 164. FIGS. 7 and 8 illustrate alternative EDU assembly configurations 214 and 314, respectively, with a corresponding IPE unit 230 and 330 with an IPE outer housing 262 and 362 that is mechanically attached along on a single plane to the EDU outer housing 244 and 344. By way of comparison to the top-mount configuration of FIGS. 2 and 3, the EDU assembly 214 of FIG. 7 is a side-mount configuration with a singular mounting plane that is parallel to the vertical axis extending through the center of the EDU's main casing 246. Contrastingly, the EDU assembly 314 of FIG. 8 is a slant-mount configuration with a singular mounting plane that is oblique to the vertical axis extending through the center of the EDU's main casing 346.

To accommodate for stack tolerances between the IPE unit's mounting plane and the traction motor/motors stored inside the EDU's protective outer housing, the IPE unit employs a compliant AC connection interface for electrically coupling to the AC busbar. With reference to FIG. 5, for example, the EDU assembly 114 is provided with an alternating current (AC) busbar 191 that is mounted inside the EDU outer housing 144. Likewise, IPE unit 130 is assembled with a flexible electrical busbar 193 that is mounted inside the PE chamber and attached to the AC busbar 191, e.g., via busbar bolt 199. The housing chassis 164 or main case 166 is fashioned with a busbar port 155 through which is received the AC busbar 191. An elongated channel 157 receives therethrough the busbar bolt 199. The IPE unit 130 further includes an AC busbar cap 159 mounted to the main case 166 closes off a top end of this elongated channel 157.

The EDU assembly 114 with fully-integrated IPE unit 130 may further provide the ability to decouple the structural modes of the system's power electronics, e.g., to mitigate noise, vibration and harshness (NVH), by adjusting the height of the single sealing/mounting plane relative to the center of gravity (CG) of the IPE unit 130. In general, the CG height may be set equal to (collinear with) the mounting plane. CG height "tuneability" allows a designer to decouple the PE structural modes by adjusting the height of the mounting plane. As shown, the CG of the IPE unit 130 is derived through system modeling, and the mounting plane is set substantially equal to the position of the CG in a vertical stack.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric drive unit (EDU) assembly for a motor vehicle with a vehicle body and multiple road wheels attached to the vehicle body, the EDU assembly comprising:
   an EDU outer housing configured to mount to the vehicle body, the EDU outer housing defining therein an internal motor chamber and an internal transmission chamber, and further defining on an exterior surface thereof an external cavity;
   a traction motor mounted inside the internal motor chamber of the EDU housing and configured to drive one or more of the road wheels to thereby propel the motor vehicle;
   a gear train mounted inside the internal transmission chamber of the EDU housing and configured to drivingly connect the traction motor to the one or more of the road wheels; and an integrated power electronics (IPE) unit operable to govern operation of the traction motor, the IPE unit including:
- an IPE outer housing with a housing chassis mounted inside the external cavity of the EDU outer housing, and a main housing mounted on the housing chassis to define therebetween a power electronics (PE) chamber; and
- a plurality of integrated circuit (IC) PE modules mounted inside the PE chamber.

2. The EDU assembly of claim 1, wherein the main housing of the IPE outer housing includes a main case and a housing cover mounted on the main case.

3. The EDU assembly of claim 2, wherein the housing cover includes a high-voltage direct current (HVDC) electrical connector, and the main case includes a high-voltage alternating current (HVAC) electrical connector.

4. The EDU assembly of claim 3, wherein the main case further includes an air conditioning control module (ACCM) HVDC electrical connector, a cabin heater control module (CHCM) HVDC electrical connector, and a storage heater control module (SHCM) HVDC electrical connector.

5. The EDU assembly of claim 2, wherein the main case includes a cooling manifold, a cooling inlet port fluidly connected to the cooling manifold and configured to feed coolant into the IPE outer housing, and a cooling exit port connected to the cooling manifold and configured to exhaust coolant from the IPE outer housing.

6. The EDU assembly of claim 2, wherein the plurality of IC PE modules includes first, second and third IC PE modules mounted between the main case and the housing cover, and a fourth IC PE module mounted between the main case and the housing chassis.

7. The EDU assembly of claim 1, wherein the plurality of IC PE modules includes a DC-DC power converter module, an AC-DC power inverter module (PIM), and an onboard charge module (OBCM).

8. The EDU assembly of claim 7, wherein the plurality of IC PE modules further includes a high-power distribution module (HPDM).

9. The EDU assembly of claim 1, wherein the IPE outer housing includes an IPE interface flange projecting from the main housing, and the EDU outer housing includes an EDU interface flange projecting from the exterior surface defining the external cavity, the IPE interface flange sealing to the EDU interface flange along a single plane.

10. The EDU assembly of claim 9, wherein the IPE interface flange extends continuously around an outer perimeter of the main housing, and the EDU interface flange extends continuously around an outer perimeter of the external cavity.

11. The EDU assembly of claim 10, further comprising a gusset extending continuously around the outer perimeter of the external cavity and sandwiched between the IPE and EDU interface flanges.

12. The EDU assembly of claim 1, wherein the EDU outer housing includes a basin defining the external cavity within which is mounted the housing chassis of the IPE outer housing, and a plurality of reinforcing ribs spaced around a perimeter of the basin.

13. The EDU assembly of claim 1, wherein the EDU assembly further includes an alternating current (AC) busbar mounted to the EDU outer housing, and the IPE unit further includes a flexible electrical busbar mounted inside the PE chamber and attached to the AC busbar.

14. The EDU assembly of claim 13, wherein the housing chassis and/or the main case defines a busbar port through which is received the AC busbar, and wherein the housing chassis and the main housing cooperatively define an elongated channel configured to pass therethrough a bolt, the bolt attaching the flexible electrical busbar to the AC busbar.

15. The EDU assembly of claim 14, wherein the IPE unit further includes an AC busbar cap mounted to the main housing and closing off one end of the elongated channel.

16. An electric-drive motor vehicle comprising:
- a vehicle body with a plurality of road wheels attached to the vehicle body;
- an electric drive unit (EDU) outer housing mounted to the vehicle body, the EDU outer housing defining therein an internal motor chamber and an internal transmission chamber, and further defining on an exterior surface thereof an external cavity;
- a traction motor mounted inside the internal motor chamber of the EDU housing and configured to drive one or more of the road wheels to thereby propel the motor vehicle;
- a gear train mounted inside the internal transmission chamber of the EDU housing and drivingly connecting the traction motor to the one or more of the road wheels; and
- an integrated power electronics (IPE) unit operable to govern operation of the traction motor, the IPE unit including:
  - an IPE outer housing with a housing chassis mounted inside the external cavity of the EDU outer housing, and a main housing mounted on the housing chassis to define therebetween a power electronics (PE) chamber; and
- a plurality of integrated circuit (IC) PE modules mounted inside the PE chamber.

17. A method of assembling an electric drive unit (EDU) assembly for a motor vehicle, the motor vehicle including a vehicle body and multiple road wheels attached to the vehicle body, the method comprising:
- providing an EDU outer housing configured to mount to the vehicle body, the EDU outer housing defining therein an internal motor chamber and an internal transmission chamber, and further defining on an exterior surface thereof an external cavity;
- mounting a traction motor inside the internal motor chamber of the EDU housing, the traction motor being configured to drive one or more of the road wheels to thereby propel the motor vehicle;
- mounting a gear train inside the internal transmission chamber of the EDU housing, the gear train being configured to drivingly connect the traction motor to the one or more road wheels;
- providing an integrated power electronics (IPE) unit operable to govern operation of the traction motor, the IPE unit including an IPE outer housing composed of a housing chassis and a main housing mounted on the housing chassis to define therebetween a power electronics (PE) chamber, and a plurality of integrated circuit (IC) PE modules mounted inside the PE chamber; and
- mounting the housing chassis inside the external cavity of the EDU outer housing.

18. The method of claim 17, wherein the main housing of the IPE outer housing includes a main case and a housing cover mounted on the main case.

19. The method of claim 17, wherein the plurality of IC PE modules include a DC-DC power converter module, an AC-DC power inverter module (PIM), and an onboard charge module (OBCM).

20. The method of claim 17, wherein the IPE outer housing includes an IPE interface flange projecting from the main housing, and the EDU outer housing includes an EDU interface flange projecting from the exterior surface defining the external cavity, the IPE interface flange sealing to the EDU interface flange along a single plane.

* * * * *